(12) United States Patent
Liu et al.

(10) Patent No.: US 10,595,039 B2
(45) Date of Patent: Mar. 17, 2020

(54) SYSTEM AND METHOD FOR CONTENT AND MOTION CONTROLLED ACTION VIDEO GENERATION

(71) Applicant: NVIDIA Corporation, Santa Clara, CA (US)

(72) Inventors: Ming-Yu Liu, Sunnyvale, CA (US); Xiaodong Yang, San Jose, CA (US); Jan Kautz, Lexington, MA (US); Sergey Tulyakov, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 15/939,098

(22) Filed: Mar. 28, 2018

(65) Prior Publication Data
US 2018/0288431 A1    Oct. 4, 2018

Related U.S. Application Data

(60) Provisional application No. 62/480,094, filed on Mar. 31, 2017.

(51) Int. Cl.
| | |
|---|---|
| *H04N 19/513* | (2014.01) |
| *G06K 9/00* | (2006.01) |
| *G06N 3/08* | (2006.01) |
| *G06T 13/40* | (2011.01) |
| *G06N 3/04* | (2006.01) |

(52) U.S. Cl.
CPC ....... *H04N 19/521* (2014.11); *G06K 9/00201* (2013.01); *G06K 9/00281* (2013.01); *G06N 3/0445* (2013.01); *G06N 3/0454* (2013.01); *G06N 3/0472* (2013.01); *G06N 3/08* (2013.01); *G06T 13/40* (2013.01); *G06T 2207/20081* (2013.01); *G06T 2207/30196* (2013.01)

(58) Field of Classification Search
CPC .. G06N 3/08; G06K 9/00901; G06K 9/00281; G06T 13/40
See application file for complete search history.

(56) References Cited

U.S. PATENT DOCUMENTS

| | | |
|---|---|---|
| 6,385,245 B1 | 5/2002 | De Haan et al. |
| 7,636,662 B2 | 12/2009 | Dimtrova et al. |

(Continued)

FOREIGN PATENT DOCUMENTS

CN        102054270 B    6/2013

OTHER PUBLICATIONS

Li et al., "Video Generation From Text," arXiv preprint arXiv:1710.00421, 2017, pp. 1-8.
(Continued)

*Primary Examiner* — Jonathan R Messmore
(74) *Attorney, Agent, or Firm* — Davis Wright Tremaine LLP

(57) ABSTRACT

A method, computer readable medium, and system are disclosed for action video generation. The method includes the steps of generating, by a recurrent neural network, a sequence of motion vectors from a first set of random variables and receiving, by a generator neural network, the sequence of motion vectors and a content vector sample. The sequence of motion vectors and the content vector sample are sampled by the generator neural network to produce a video clip.

20 Claims, 14 Drawing Sheets

(56) References Cited

U.S. PATENT DOCUMENTS

| | | |
|---|---|---|
| 7,797,259 B2 | 9/2010 | Jiang et al. |
| 9,020,239 B2 | 4/2015 | Graepel et al. |
| 9,053,562 B1 | 6/2015 | Rabin et al. |
| 9,449,412 B1 | 9/2016 | Rogers et al. |
| 9,524,582 B2 | 12/2016 | Ma et al. |
| 9,786,084 B1 | 10/2017 | Bhat et al. |
| 2013/0124206 A1 | 5/2013 | Rezvani et al. |
| 2016/0232440 A1 | 8/2016 | Gregor et al. |
| 2017/0127016 A1 | 5/2017 | Yu et al. |
| 2017/0278135 A1 | 9/2017 | Majumdar et al. |
| 2017/0285732 A1* | 10/2017 | Daly ............... G06F 3/011 |
| 2017/0293815 A1 | 10/2017 | Cosatto et al. |
| 2017/0351935 A1 | 12/2017 | Liu et al. |
| 2018/0176576 A1* | 6/2018 | Rippel ............. H04N 19/126 |

OTHER PUBLICATIONS

Villegas et al., "Decomposing motion and content for natural video sequence prediction," arXiv preprint arXiv:1706.08033, 2017, pp. 1-22.
Saito et al., "Temporal Generative Adversarial Nets," arXiv:1611.06624v1, Nov. 21, 2017, pp. 1-10.
Vondrick et al., "Generating Videos with Scene Dynamics," 29th Conference on Neural Information Processing Systems (NIPS), 2016, pp. 1-10.
IEEE Computer Society, "IEEE Standard 754-2008 (Revision of IEEE Standard 754-1985): IEEE Standard for Floating-Point Arithmetic," The Institute of Electrical and Electronics Engineers, Inc., Aug. 29, 2008, 70 pages.

\* cited by examiner

SYSTEM AND METHOD FOR CONTENT AND MOTION CONTROLLED ACTION VIDEO GENERATION

CLAIM OF PRIORITY

This application claims the benefit of U.S. Provisional Application No. 62/480,094 titled "Content and Motion Controlled Action Video Generation," filed Mar. 31, 2017, the entire contents of which is incorporated herein by reference.

FIELD OF THE INVENTION

The present invention relates to video generation, and more particularly to content and motion controlled action video generation.

BACKGROUND

Deep generative models have recently received an increasing amount of attention, not only because deep generative models provide a means to learn deep feature representations in an unsupervised manner that can potentially leverage all the unlabeled images on Internet for training, but also because they can be used to generate novel images useful for various vision applications. As steady progress toward better image generation is made, it is also important to study the video generation problem. However, the extension from generating images to generating videos turns out to be a highly challenging task, although the generated data has just one more dimension—the time dimension.

The video generation problem may be a much harder problem for the following reasons. First, since a video is a spatio-temporal recording of visual information of objects performing various actions, a generative model needs to learn the plausible physical motion models of objects in addition to learning appearance models for the objects. If the learned object motion model is incorrect, the generated video may contain objects performing physically impossible motion. Second, the time dimension brings in a huge amount of variations. Consider the speed variations that a person can have as performing a squat movement. Each speed pattern results in a different video, although the appearances of the human in the videos are the same. Third, as human beings have evolved to be rather sensitive to motion, motion artifacts are particularly perceptible.

There is a need for addressing these issues and/or other issues associated with the prior art.

SUMMARY

A method, computer readable medium, and system are disclosed for generating a video clip. A recurrent neural network generates a sequence of motion vectors from a first set of random variables and a generator neural network receives the sequence of motion vectors and a content vector sample. The sequence of motion vectors and the content vector sample are processed by the generator neural network to produce a video clip.

DETAILED DESCRIPTION

A video clip may be considered to be a point in a latent space and a generative adversarial network framework may be used to learn a mapping from the latent space to video clips. However, assuming a video clip is a point in the latent space unnecessarily increases the complexity of the video generation problem because videos of the same action with different execution speed are represented by different points in the latent space. Moreover, assuming a video clip is a point in the latent space forces every generated video clip to have the same length, while the length of real-world video clips varies. An alternative approach assumes a latent space of images and considers that a video clip is generated by traversing the points in the latent space. Video clips of different lengths correspond to latent space trajectories of different lengths.

In addition, as videos are about objects (content) performing actions (motion), the latent space of images should be further decomposed into two subspaces, where the deviation of a point in the first subspace (the content subspace) leads content changes in a video clip and the deviation in the second subspace (the motion subspace) results in temporal motions. Through this modeling, videos of the same action executed with different speeds can be generated by traversing the same trajectory in the motion space with different speeds.

Figure 1A:
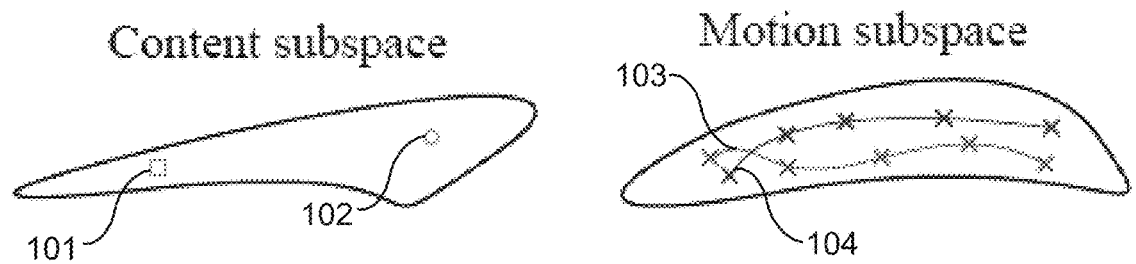
FIG. 1A is a conceptual diagram illustrating an image latent space divided into a content subspace and a motion subspace, in accordance with one embodiment.

FIG. 1A is a conceptual diagram illustrating an image latent space divided into a content subspace and a motion subspace, in accordance with one embodiment. A first content vector sample 101 and a second content vector sample 102 may be used to generate two different video clips using a single motion trajectory defined by a sequence of motion vectors. A first motion trajectory 103 and a second motion trajectory 104 are each sampled in the motion subspace to produce two different sequences of motion vectors. A single content vector sample may be used to generate two different video clips using each of the motion trajectories 103 and 104.

Decomposing motion and content allows a more controlled video generation process. By changing the content representation while fixing the motion trajectory, video clips may be generated of different objects performing the same motion. By sampling different points in the content subspace and the same motion trajectory in the motion subspace, video clips may be generated of different objects performing the same motion.

Figure 1B:
FIG. 1B illustrates video clips generated using different points in the content subspace and a single motion trajectory in the motion subspace, in accordance with one embodiment.

FIG. 1B illustrates video clips generated using different points in the content subspace and a single motion trajectory in the motion subspace, in accordance with one embodiment. Images in the upper row of FIG. 1B are generated using the second content vector sample 102 and the first motion trajectory 103. In one embodiment, as shown in FIG. 1B, the first motion trajectory 103 corresponds to an expression of fear. Images in the lower row of FIG. 1B are generated using the first content vector sample 101 and the first motion trajectory 103.

Figure 1C:
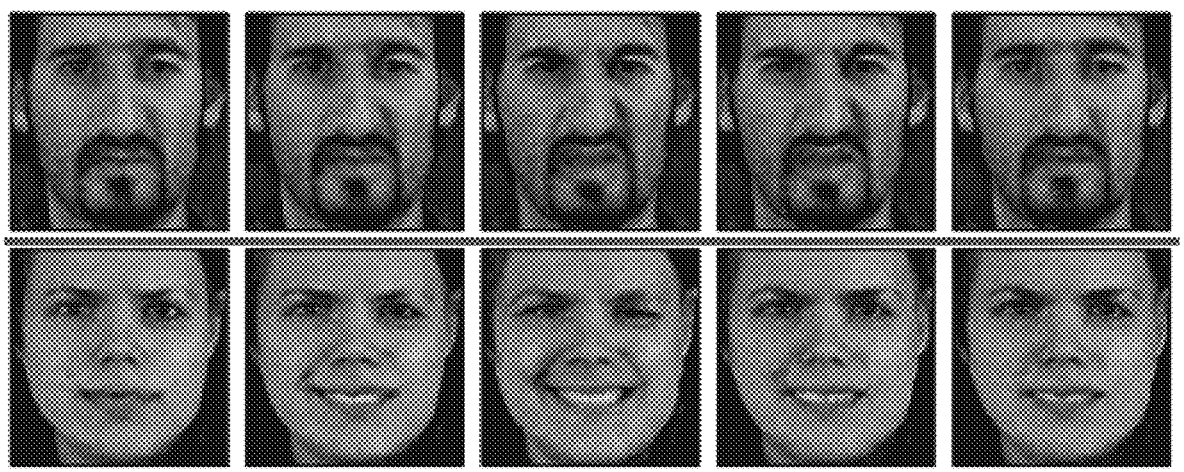
FIG. 1C illustrates video clips generated using the different points in the content subspace shown in FIG. 1B and a second motion trajectory in the motion subspace, in accordance with one embodiment.

FIG. 1C illustrates video clips generated using the different points in the content subspace shown in FIG. 1B and a second motion trajectory in the motion subspace, in accordance with one embodiment. As shown in FIGS. 1B and 1C, different video clips may be generated of the same object performing different motion by applying a different trajectory in the motion subspace to the same content vector sample 101 or 102. In one embodiment, as shown in FIG. 1C, the first motion trajectory 104 corresponds to an expression of disgust. Images in the upper row of FIG. 1C are generated using the second content vector sample 102 and the second motion trajectory 104. Images in the lower row of FIG. 1C are generated using the first content vector sample 101 and the second motion trajectory 104. By changing motion trajectories while fixing the content representation, videos may be generated of the same object performing different motion.

Figure 1D:
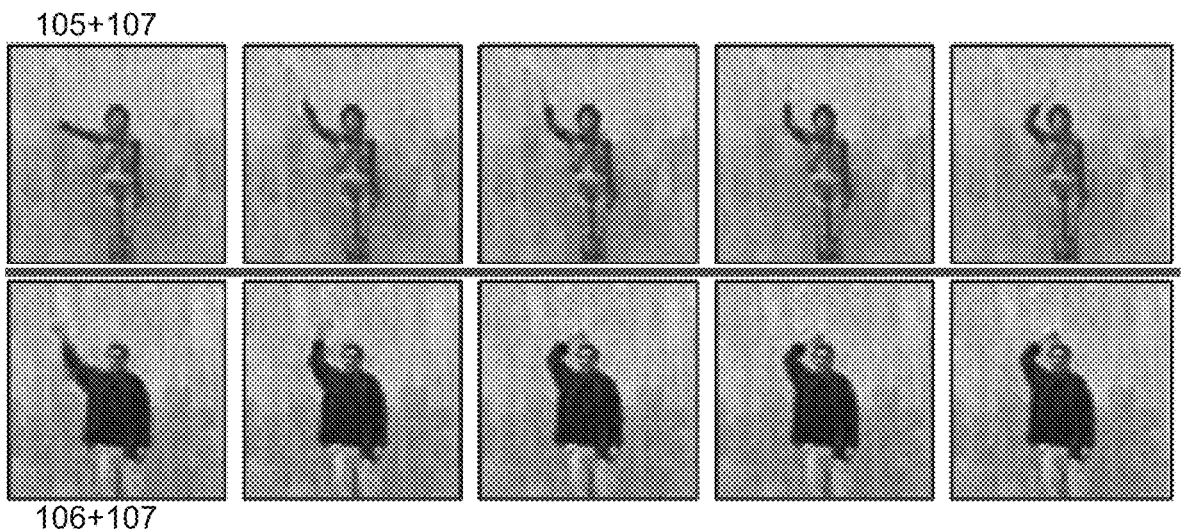
FIG. 1D illustrates video clips generated using different points in a second content subspace and a single motion trajectory in a second motion subspace, in accordance with one embodiment.

FIG. 1D illustrates video clips generated using different points in a second content subspace and a single motion trajectory in a second motion subspace, in accordance with one embodiment. In one embodiment, as shown in FIG. 1D, a third motion trajectory 107 corresponds to a motion of waving one hand. Images in the upper row of FIG. 1D are generated using a third content vector sample 105 and the third motion trajectory 107. Images in the lower row of FIG. 1D are generated using the fourth content vector sample 106 and the third motion trajectory 107. Video clips may be generated of different objects performing the same motion by applying the same motion trajectory in the motion subspace to different sampled points in the content subspace.

Figure 1E:
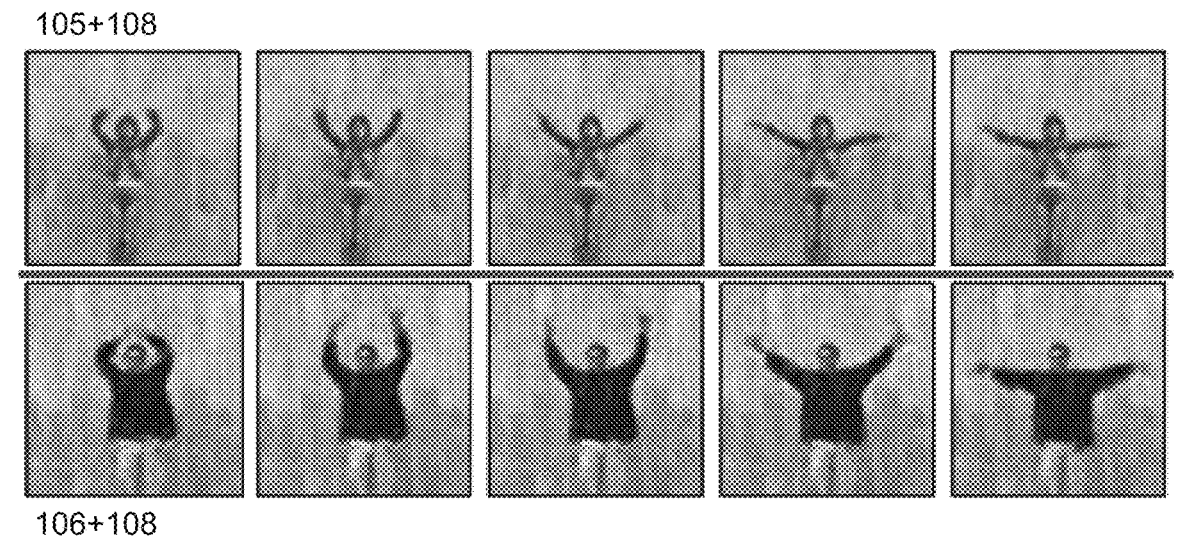
FIG. 1E illustrates video clips generated using the different points in the second content subspace shown in FIG. 1D and a second motion trajectory in the second motion subspace, in accordance with one embodiment.

FIG. 1E illustrates video clips generated using the different points in the second content subspace shown in FIG. 1D and a fourth motion trajectory in the second motion subspace, in accordance with one embodiment. As shown in FIGS. 1D and 1E, different video clips may be generated of the same object performing different motion by applying a different trajectory in the second motion subspace to the same content vector sample 105 or 106. In one embodiment, as shown in FIG. 1E, the fourth motion trajectory 108 corresponds to waving two hands. Images in the upper row of FIG. 1E are generated using the third content vector sample 105 and the fourth motion trajectory 108. Images in the lower row of FIG. 1E are generated using the fourth content vector sample 106 and the fourth motion trajectory 108.

A video generation framework, such as Motion and Content decomposed Generative Adversarial Network (MoCoGAN) framework, may be used for video generation using a motion and content decomposed representation of the image latent space, where each latent code represents an image. In one embodiment, the video generation framework generates a video clip by sequentially generating video frames. At each time step (e.g., frame), an image generative network maps a random vector to an image. The random vector consists of two parts where the first is sampled from the content subspace and the second is sampled from the motion subspace. The content component represents the objects present in the video clip and the motion component represents the object dynamics.

Figure 1F:
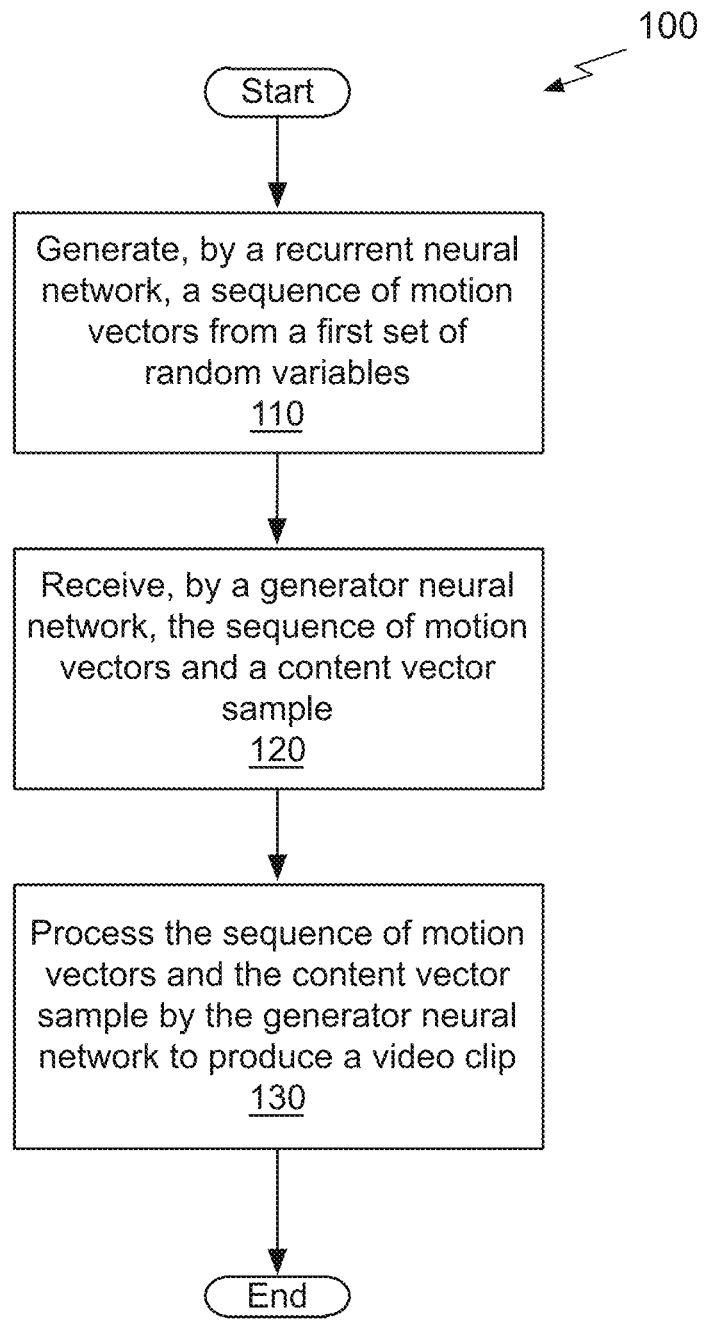
FIG. 1F illustrates a flowchart of a method for generating a video clip, in accordance with one embodiment.

FIG. 1F illustrates a flowchart of a method 100 for generating a video clip, in accordance with one embodiment. Although method 100 is described in the context of a video generation system, the method 100 may also be performed by a program, custom circuitry, or by a combination of custom circuitry and a program. For example, the method 100 may be executed by a GPU (graphics processing unit), CPU (central processing unit), or any processor capable of implementing a recurrent neural network (RNN) and a generator neural network. Furthermore, persons of ordinary skill in the art will understand that any system that performs method 100 is within the scope and spirit of embodiments of the present invention.

At step 110, an RNN included in the video generation system generates a sequence of motion vectors from a first set of random variables. In one embodiment, network parameters used by the RNN to sample the motion subspace and produce the sequence of motion vectors are learned during training. Despite lacking supervision regarding the decomposition of motion and content in natural videos, in one embodiment, the video generation system can learn to disentangle these two components using an adversarial training scheme. In one embodiment, the adversarial training scheme includes both image and video discriminators and is used to train the RNN and a generator neural network. The combination of the generator neural network and discriminators forms a generative adversarial network (GAN).

At step 120, the generator neural network included in the video generation system receives the sequence of motion vectors and a content vector sample. Because content in a short video clip usually remains the same, in one embodiment, the content subspace is modeled using a Gaussian distribution and the same realization may be used to generate each frame in the video clip. In one embodiment, an encoder generates the content vector sample based on identified content. In other words, a content vector sample for a particular animal, adult or child, man or women, etc., may be selected by the encoder.

At step 130, the sequence of motion vectors and the content vector sample are processed by the generator neural network to produce a video clip. The objective of the generator neural network is to generate images resembling real images. In one embodiment, the video generation system also includes at least one of an image and video discriminator that distinguishes real images from generated ones. The discriminator(s) is used to train the generator neural network to generate images that appear to be real. In one embodiment, the generator neural network and discriminator(s) in the GAN may each be implemented as convolutional neural networks (CNNs). After being trained, the RNN and generator neural network may be deployed to generate realistic video clips with controlled content and motion and varying numbers of frames.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

A latent space of images $Z_I = \mathbb{R}^d$ where each point $z \in Z_I$ represents an image, and a video of K frames is represented by a path of length K in the latent space, $[z^{(1)}, \ldots, z^{(K)}]$. The value of K can vary to control the length of the video clip that is generated. Therefore, videos of different lengths can be generated by paths of different lengths. Moreover, videos of the same action executed with different speeds can be generated by traversing the same path in the latent space with different speeds.

As previously described in conjunction with FIG. 1A, $Z_I$ may be decomposed into the content $Z_C$ and motion $Z_M$ subspaces: $Z_I = Z_C \times Z_M$ where $Z_C = \mathbb{R}^{d_C}$, $Z_M = \mathbb{R}^{d_M}$, and $d = d_C + d_M$. The content subspace models motion-independent appearance in videos, while the motion subspace models motion-dependent appearance in videos. For example, in a video of a person smiling, content represents the identity of the person, while motion represents the changes of facial muscle configurations of the person. A combination of the person's identity and the facial muscle configuration represents a face image of the person. A sequence of combinations represents a video clip of the person smiling. By swapping the look of the person with the look of another person, a video of a different person smiling is represented.

In one embodiment, the content subspace is modeled using a Gaussian distribution: $z_C \sim p_{Z_C} \equiv \mathcal{N}(z|0, I_{d_C})$ where $I_{d_C}$ is an identity matrix of size $d_C \times d_C$. Based on the observation that the content remains largely the same in a short video clip, the same realization, $z_C$, is used for generating different frames in a video clip. Motion in the video clip is modeled by a trajectory (i.e., path) in the motion subspace $Z_M$. The sequence of vectors for generating a video is represented by $$[z^{(1)}, \ldots, z^{(K)}] = \left[ \begin{bmatrix} z_C \\ z_M^{(1)} \end{bmatrix}, \ldots, \begin{bmatrix} z_C \\ z_M^{(K)} \end{bmatrix} \right] \quad (1)$$

where $z_C \in Z_C$ and $z_M^{(k)} \in Z_M$ for all k's. Since not all paths in $Z_M$ correspond to physically plausible motion, the RNN should learn to generate valid paths.

Figure 2A:
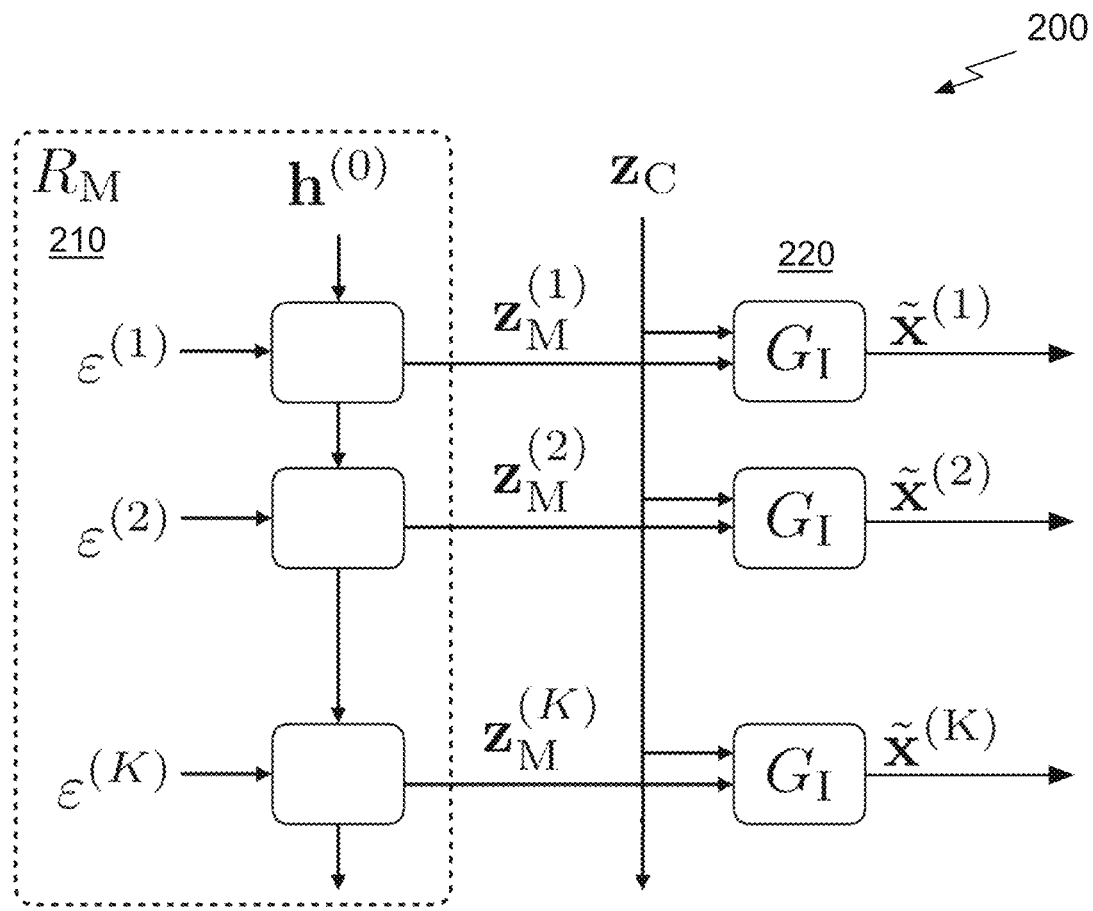
FIG. 2A illustrates a block diagram of a video generation system, in accordance with one embodiment.
Figure 2A:
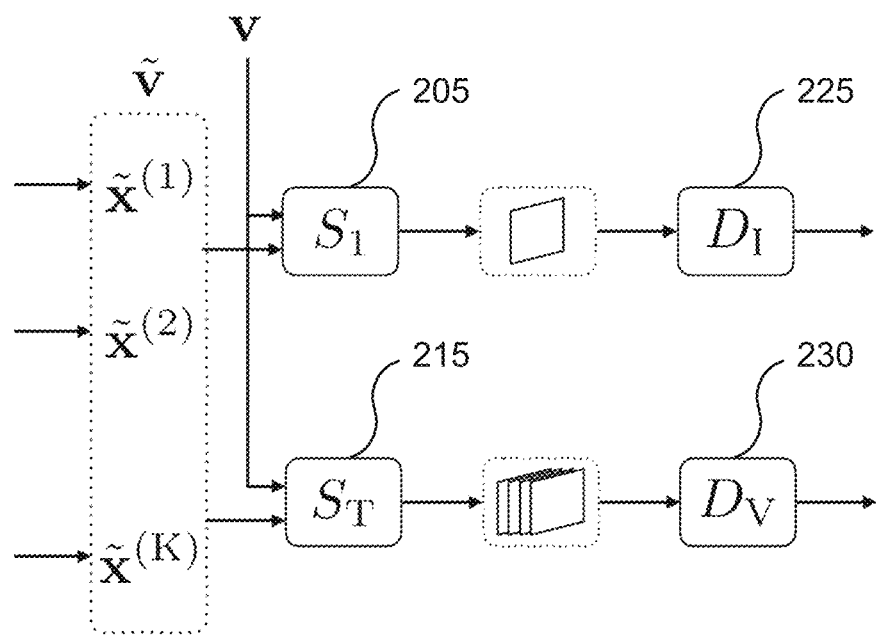

FIG. 2A illustrates a block diagram of a video generation system 200, in accordance with one embodiment. The video generation system 200 includes an RNN 210, a generator neural network 220, samplers 205 and 215, image discriminator 225, and video discriminator 230.

The content subspace may be sampled once to produce a fixed content vector sample ($z_C$) while a series of random variables $[\epsilon^{(1)}, \ldots, \epsilon^{(K)}]$ is sampled and mapped to a sequence of motion vectors (represented as a series of motion codes $[z_M^{(1)}, \ldots, z_M^{(K)}]$) by the RNN($R_M$) 210. The hidden state of the RNN 210 is $h^{(0)}$. In one embodiment, at each time step, the RNN 210 samples a random motion vector from a Gaussian distribution $\epsilon^{(k)} \sim p_E \equiv \mathcal{N}(\epsilon|0, I_{d_E})$ of the random variables and outputs a vector in $Z_M$, which is used as the motion representation. Let $R_M(k)$ be the output of the recurrent neural network at time k. Then, $z_M^{(K)} = R_M(k)$. Intuitively, the function of the RNN 210 is to map a sequence of independent and identically distributed (i.i.d.) random variables $[\epsilon^{(1)}, \ldots, \epsilon^{(K)}]$ to a sequence of correlated random variables $[R_M(1), \ldots, R_M(l)]$ representing the dynamics in a video. Injecting noise at every iteration models uncertainty of the future motion at each timestep. In one embodiment the RNN 210 is implemented using a one-layer gated recurrent (GRU) neural network.

The generator neural network ($G_I$) 220 produces a video clip ($\tilde{v}$) using the sequence of motion vectors and the content vector sample, where the video clip includes frames $\tilde{x}^{(K)}$, where K is the number of frames. The vectors in $Z_I$ are mapped to images by the generator neural network 220, from a sequence of vectors $$\left[ \begin{bmatrix} z_C \\ z_M^{(1)} \end{bmatrix}, \ldots, \begin{bmatrix} z_C \\ z_M^{(K)} \end{bmatrix} \right]$$

to a sequence of images, $\tilde{v} = [\tilde{x}^{(1)}, \ldots, \tilde{x}^{(K)}]$, where $$\tilde{x}^{(k)} = G_I\left( \begin{bmatrix} z_C \\ z_M^{(k)} \end{bmatrix} \right)$$

and $z_M^{(k)}$'s are from the RNN 210.

During training, parameters (e.g., weights) of the RNN 210 and generator neural network 220 are updated to improve accuracy of the video generation system 200 (where accuracy means generated video clips are judged by the discriminators to be real). The sampler ($S_1$) 205, is a function that samples a single frame from a video clip and the sampler $S_T$ 215 is a function that samples T consecutive frames of a video clip. The generated video clip and a real video clip (v from a training dataset) are sampled by the image sampler 205 and a video sampler 215. The image sampler samples individual images from the generated video clip and the real video clip. The video sampler samples sequences of consecutive frames from the generated video clip and the real video clip to produce sets of sequential frames (i.e., shorter video clips). An image discriminator ($D_I$) distinguishes real images from generated images. A video discriminator ($D_V$) distinguishes real video clips from generated video clips. $D_I$ is the image discriminator 225 and $D_V$ is the video discriminator 230. The image discriminator 225 is an image discriminative neural network that is trained using real and fake images and the video discriminator 230 is a video discriminative neural network that is trained using real and fake (e.g., synthesized) videos. The image discriminator 225 and the video discriminator 230 each generate a true/false output (i.e., real/not real).

The generator neural network 220 can be trained to synthesize an image that resembles an image x drawn from a distribution $p_X$ of real images from a content component of a random vector input z, where $Z_I = \mathbb{R}^d$. The generator neural network 220 receives z as an input and outputs an image, $\tilde{x} = G_I(z)$, that has the same support as x, where the distribution of $G_I(z)$ is $p_{G_I}$. The image discriminator 225 estimates the probability that an input image is drawn from $p_X$. Ideally, $D_I(x)=1$ if $x \sim p_X$ and $D_I(\tilde{x})=0$ if $\tilde{x} \sim p_{G_I}$. Training of the image discriminator 225 ($D_I$) and the video discriminator 230 ($D_V$) is achieved by solving a minimax problem given by $$\max_{G_I} \min_{D_I} \mathcal{F}_I(D_I, G_I) \quad (2)$$

where the functional $\mathcal{F}_I$ is given by $$\mathcal{F}_I(D_I, G_I) = \mathbb{E}_{x \sim p_X}[-\log D_I(x)] + \mathbb{E}_{x \sim p_{z_I}}[-\log(1 - D_I(G_I(z)))]. \quad (3)$$

In practice, equation (2) is solved by alternating gradient update.

Given enough capacity to $D_I$ and $G_I$ and sufficient training iterations, the distribution $p_{G_I}$ converges to $p_X$. As a result, from a random vector input z, the generator neural network 220 ($G_I$) can synthesize an image that resembles one drawn from the true distribution, $p_X$.

Figure 2B:
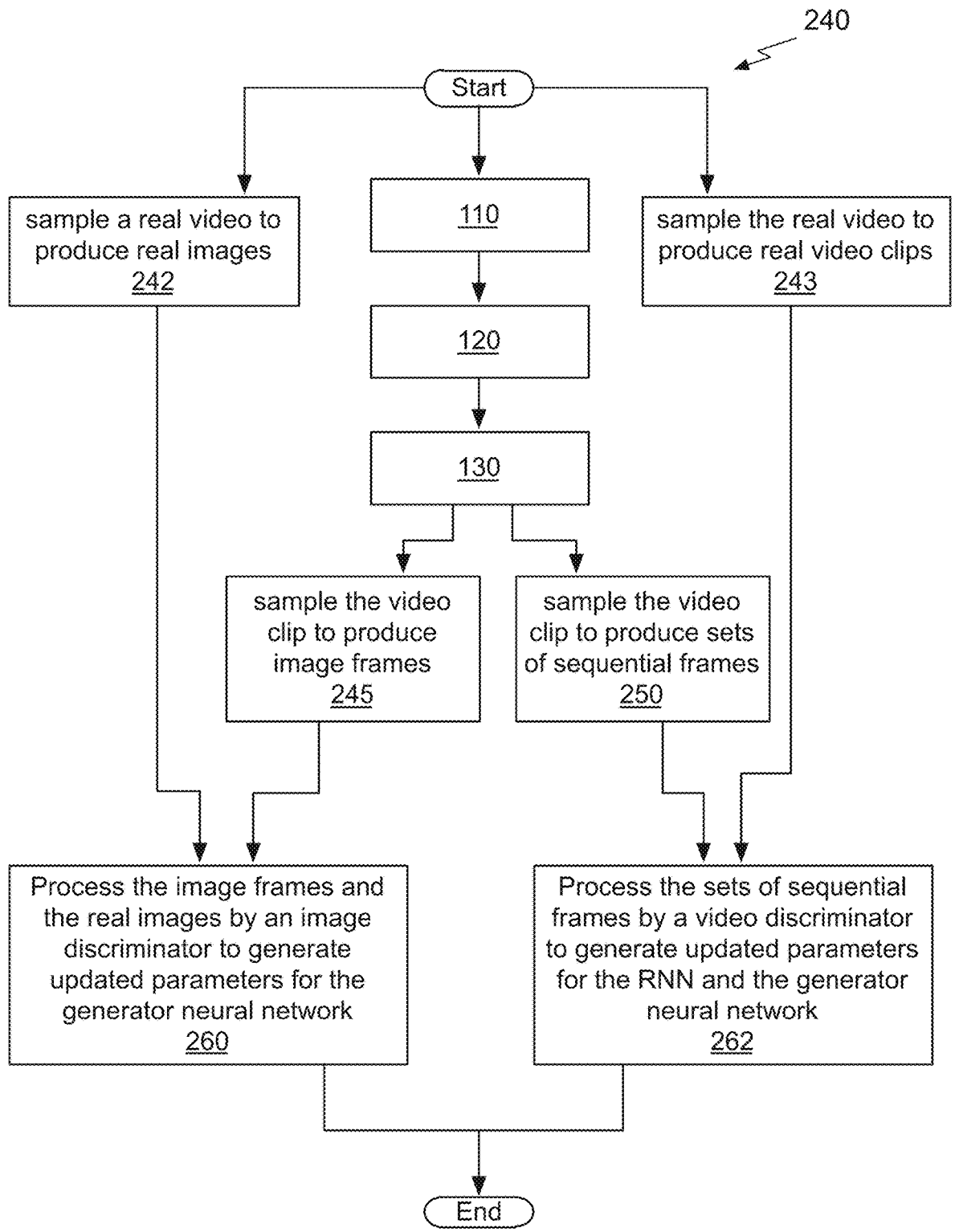
FIG. 2B illustrates a flowchart of a method for training the video generation system, in accordance with one embodiment.

FIG. 2B illustrates a flowchart of a method 240 for training the video generation system 200, in accordance with one embodiment. Although method 240 is described in the context of a video generation system, the method 240 may also be performed by a program, custom circuitry, or by a combination of custom circuitry and a program. For example, the method 100 may be executed by a GPU, CPU, or any processor capable of implementing the RNN 210, the generator neural network 220, the image discriminator 225, and the video discriminator 230. Furthermore, persons of ordinary skill in the art will understand that any system that performs method 240 is within the scope and spirit of embodiments of the present invention.

The steps 110, 120, and 130 are performed as previously described in conjunction with FIG. 1F. Real videos are provided during the training phase of the video generation system 200. At step 242, the image sampler 205 samples a real video to produce real images. At step 245, the image sampler 205 samples the generated video clip to produce image frames. At step 243, the video sampler 215 samples the real video to produce real video clips. At step 250, the video sampler 215 samples the generated video clip to produce sets of sequential frames.

At step 260, the image discriminator 225 processes the real images and the image frames to generate updated parameters for the generator neural network 220. The image discriminator 225 processes the image frames to distinguish the real images from generated image frames and generate the updated parameters to reduce differences between the real images and the image frames produced by the generator neural network 220. At step 262, the video discriminator 230 processes the real video clips and the sets of sequential frames to generate updated parameters for the RNN 210 and the generator neural network 220. The video discriminator 230 processes the image frames to distinguish the real images from generated image frames and generate the updated parameters to reduce differences between the real images and the image frames produced by the generator neural network 220. Once training is completed the video generating system 200 may be deployed to generate video clips.

Both the image discriminator 225 and the video discriminator 230 play the role of judge, providing criticisms to the RNN 210 and the generator neural network 220. The image discriminator 225 is specialized in criticizing the generator neural network 220 based on individual images. The image discriminator 225 is trained to determine if a frame is sampled from a real video clip, v, or from a generated video clip $\tilde{v}$. On the other hand, the video discriminator 230 provides criticisms to the generator neural network 220 based on the generated video clip. The video discriminator 230 takes a fixed length video clip, of T frames, and decides if a video clip was sampled from a real video or from $\tilde{v}$. In contrast with the image discriminator 225, which is based on a CNN architecture, the video discriminator 230 is based on a spatio-temporal CNN architecture. In one embodiment, the video clip length T is a hyperparameter that is set to 16. T can be smaller than the generated video length K. A video clip of length K can be divided into K−T+1 clips in a sliding-window fashion, and each of the T length sequences can be input to the video discriminator 230.

The video discriminator 230 also evaluates the generated motion. Since the generator neural network 220 has no concept of motion, the criticisms on the motion part go directly to the RNN 210. In order to generate a video with realistic dynamics that fools the video discriminator 230, the RNN 210 has to learn to generate a sequence of motion codes $[z_M^{(1)}, \ldots, z_M^{(K)}]$ from a sequence of i.i.d. noise inputs $[\epsilon^{(1)}, \ldots, \epsilon^{(K)}]$ in a way such that the generator neural network 220 can map $z^{(k)} = [z_C, z_M^{(k)}]$ to consecutive frames in a video.

Ideally, the video discriminator 230 alone should be sufficient for training the generator neural network 220 and the RNN 210, because the video discriminator 230 provides feedback on both static image appearance and video dynamics. However, in one embodiment, using image discriminator 225 significantly improves the convergence of the adversarial training. This may be because training the image discriminator 225 is simpler, as it only needs to focus on static appearances.

Let $p_V$ be the distribution of video clips of variable lengths. Let $\kappa$ be a discrete random variable denoting the length of a video clip sampled from $p_V$. (In practice, the distribution of $\kappa$, termed $p_K$, can be estimated by computing a histogram of video clip length from training data). To generate a video, a content vector, $z_C$, and a length, $\kappa$ are sampled. The RNN 210 is then operated for $\kappa$ steps and, at each time step, the RNN 210 takes a random variable $\epsilon$ as the input. A generated video is then given by $$\tilde{v} = \left[ G_I\left( \begin{bmatrix} z_C \\ R_M(1) \end{bmatrix} \right), \ldots, G_I\left( \begin{bmatrix} z_C \\ R_M(\kappa) \end{bmatrix} \right) \right].$$

Recall that image discriminator 225 and the video discriminator 230 take one frame and T consecutive frames in a video as input, respectively. In order to represent the sampling mechanisms, two random access functions, the image sampler 205 and the video sampler 215 are introduced. The image sampler 205 takes a video clip (either $v \sim p_V$ or $\tilde{v} \sim p_{\tilde{V}}$) and outputs a random frame from the clip, while the video sampler 215 takes a video clip and randomly returns T consecutive frames from the clip. With this notation, the video generation system learning problem is:

$$\max_{G_I, R_M} \min_{D_I, D_V} \mathcal{F}_V(D_I, D_V, G_I, R_M) \quad (5)$$

Where the objective function $\mathcal{F}_V(D_I, D_V, G_I, R_M)$ is $$\mathbb{E}_v[-\log D_I(S_1(v))] + \mathbb{E}_{\tilde{v}}[-\log(1-D_I(S_1(\tilde{v})))] + \\ \mathbb{E}_v[-\log D_V(S_T(v))] + \mathbb{E}_{\tilde{v}}[-\log(1-D_V(S_T(\tilde{v})))], \quad (6)$$

Where $\mathbb{E}_v$ is a shorthand for $\mathbb{E}_{v \sim p_V}$ and $\mathbb{E}_{\tilde{v}}$ for $\mathbb{E}_{\tilde{v} \sim p_V}$. In equation (6), the first and second terms encourage image discriminator 225 to output 1 for a video frame from a real video clip v and 0 for a video frame from a generated one v. Similarly, the third and fourth terms encourage 1)y to output 1 for T consecutive frames in a real video clip v and 0 for T consecutive frames in a generated one ṽ. The second and fourth terms encourage the image generator and the recurrent neural network to produce realistic images and video sequences of T-consecutive frames, such that no discriminator can distinguish them from real images and videos.

In one embodiment, the video generation system 200 is trained using the alternating gradient update algorithm. Specifically, in one step, the image discriminator 225 and the video discriminator 230 are updated while fixing the generator neural network 220 and the RNN 210. In the alternating step, the generator neural network 220 and the RNN 210 are updated while fixing the image discriminator 225 and the video discriminator 230.

Figure 2C:
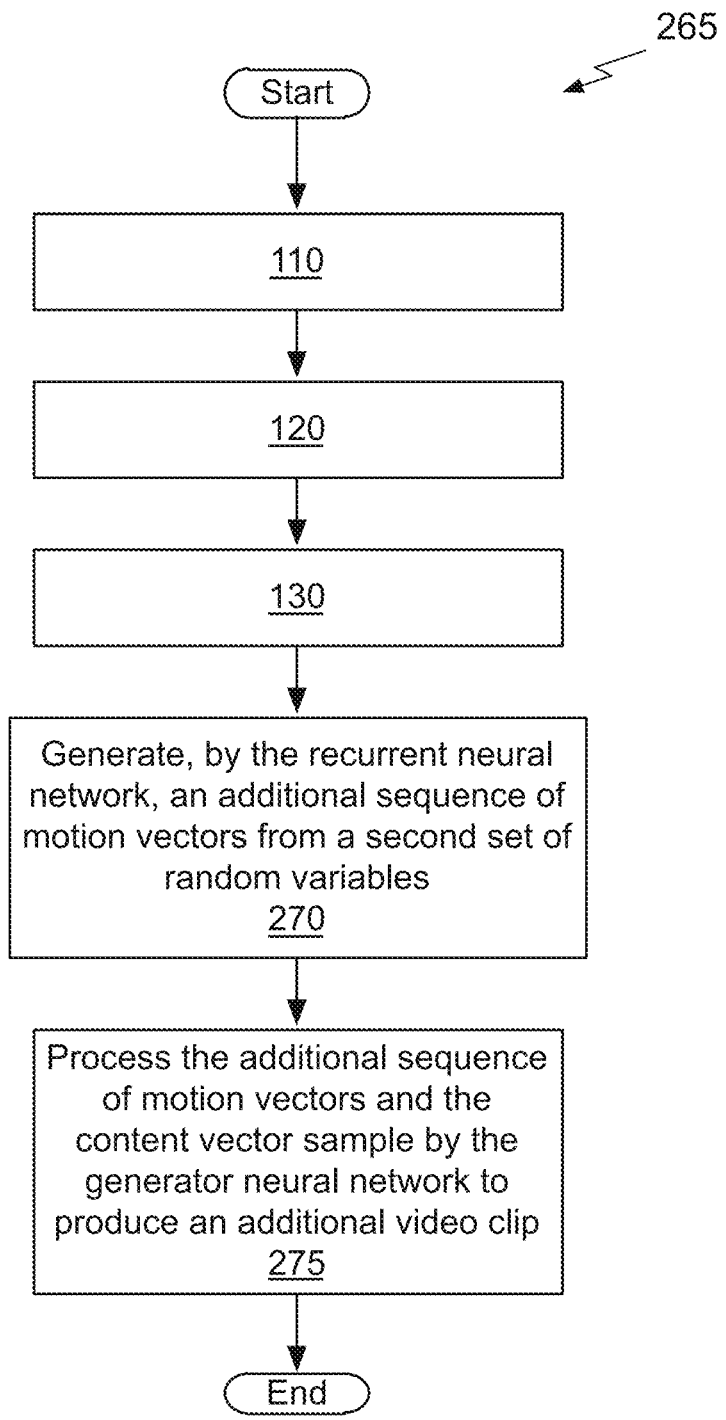
FIG. 2C illustrates another flowchart of a method for generating a video clip, in accordance with one embodiment.

FIG. 2C illustrates another flowchart of a method 265 for generating a video clip, in accordance with one embodiment. Although method 265 is described in the context of a video generation system, the method 265 may also be performed by a program, custom circuitry, or by a combination of custom circuitry and a program. For example, the method 265 may be executed by a GPU, CPU, or any processor capable of implementing the RNN 210 and the generator neural network 220. Furthermore, persons of ordinary skill in the art will understand that any system that performs method 265 is within the scope and spirit of embodiments of the present invention.

The steps 110, 120, and 130 are performed as previously described in conjunction with FIG. 1F. At step 270, the RNN 210 generates an additional sequence of motion vectors from a second set of random variables. The second set of random variables encodes a second path in the motion subspace. For example, the second set of random variables may define the motion trajectory 104 while, at step 110, the first set of random variables defines the motion trajectory 103. At step 275, the generator neural network 220 processes the additional sequence of motion vectors and the content vector to produce an additional video clip. For example, the content vector may be the content sample vector 102 and the video clip and the additional video clip may be the top rows of FIGS. 1B and 1C, respectively. In another example, the content vector may be the content sample vector 101 and the video clip and the additional video clip may be the bottom rows of FIGS. 1B and 1C, respectively.

Figure 2D:
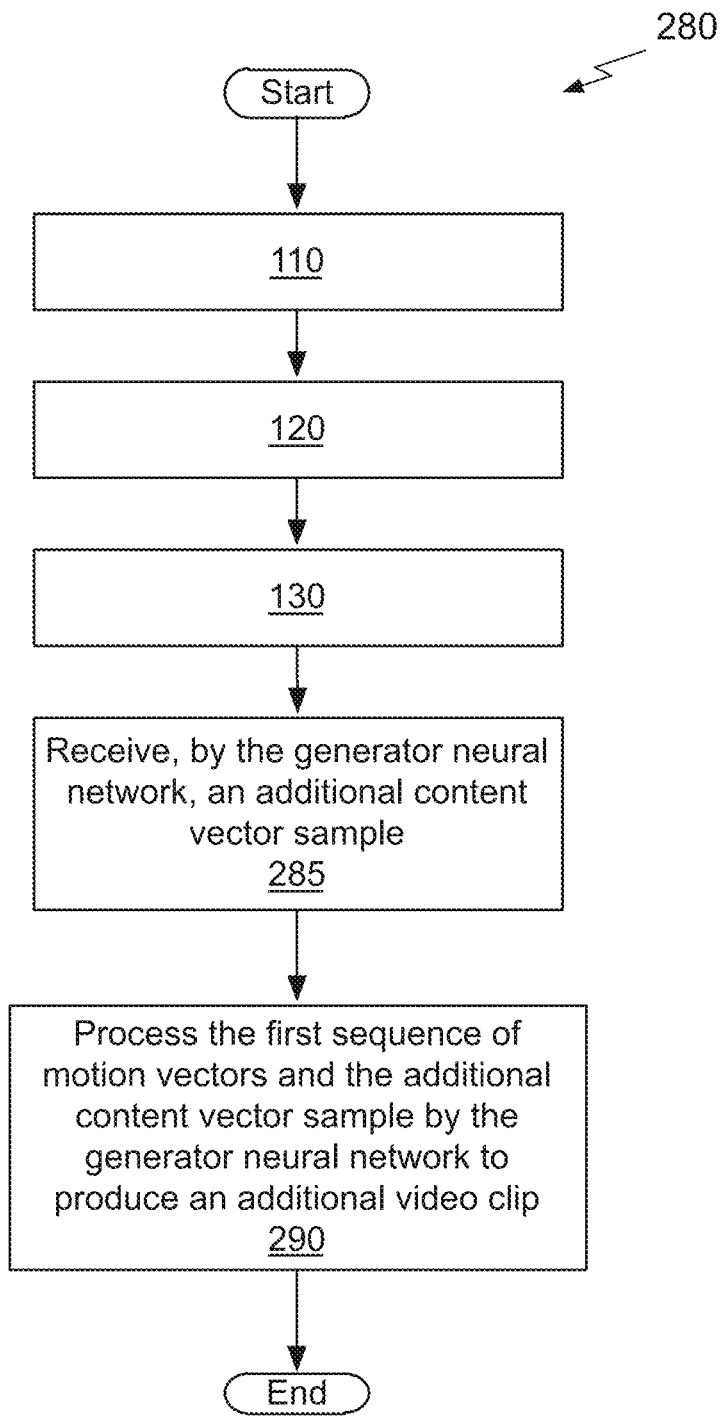
FIG. 2D illustrates another flowchart of a method for generating a video clip, in accordance with one embodiment.

FIG. 2D illustrates another flowchart of a method 280 for generating a video clip, in accordance with one embodiment. Although method 280 is described in the context of a video generation system, the method 280 may also be performed by a program, custom circuitry, or by a combination of custom circuitry and a program. For example, the method 280 may be executed by a GPU, CPU, or any processor capable of implementing the RNN 210 and the generator neural network 220. Furthermore, persons of ordinary skill in the art will understand that any system that performs method 280 is within the scope and spirit of embodiments of the present invention.

The steps 110, 120, and 130 are performed as previously described in conjunction with FIG. 1F. At step 285, the generator neural network 220 receives an additional content vector sample. In one embodiment, the additional content vector sample is different than the content vector samples received at step 120. For example, the content vector sample may correspond to the third content vector sample 105 while the additional content vector sample corresponds to the fourth content vector sample 106 shown in FIGS. 1D and 1E. At step 290, the generator neural network 220 processes the first sequence of motion vectors and the additional content sample vector to produce an additional video clip. For example, the content vector sample and the additional content vector sample may be the third content vector sample 105 and the fourth content vector sample 106 that are both processed with the motion trajectory vector 107 or 108 to produce the video clips shown in FIGS. 1D and 1E, respectively. In another example, the content vector may be the content sample vector 101 and the video clip and the additional video clip may be the bottom rows of FIGS. 1B and 1C, respectively.

Figure 2E:
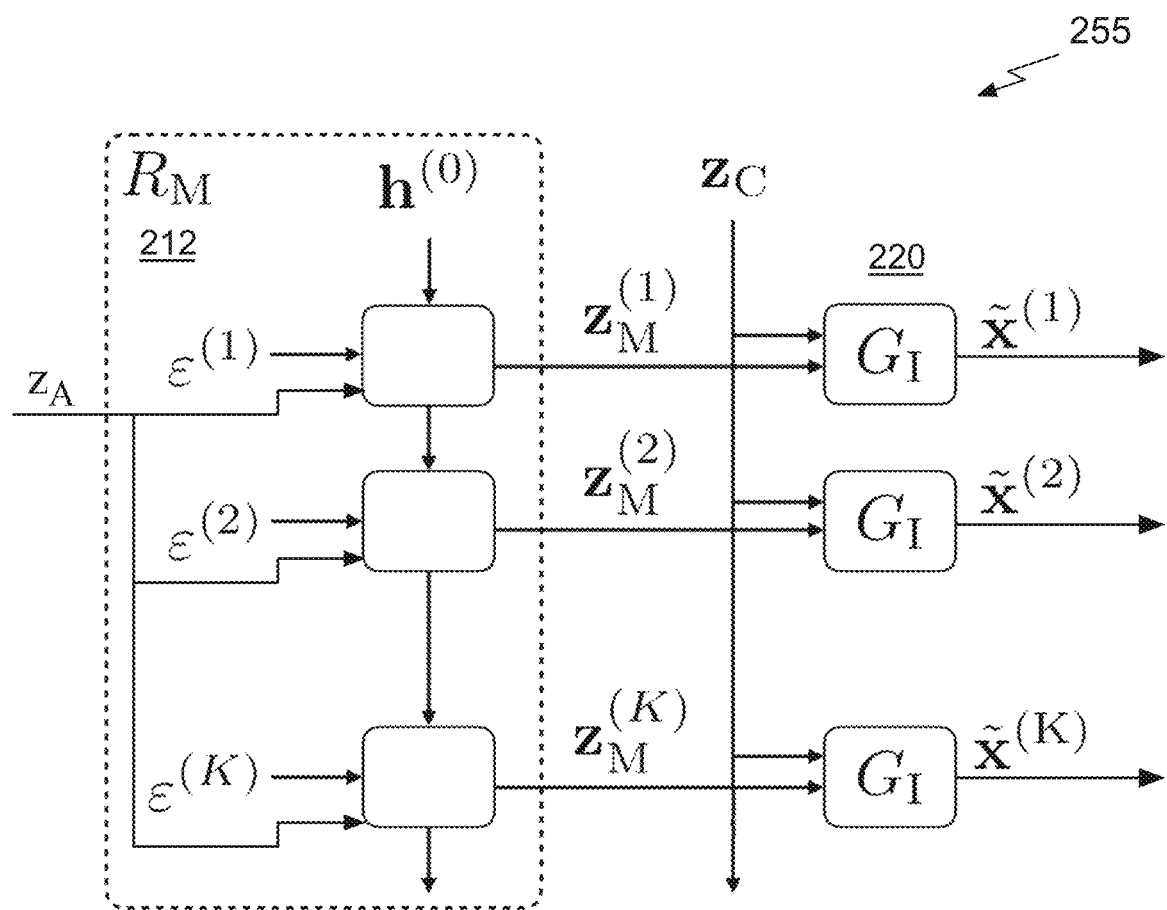
FIG. 2E illustrates another block diagram of a video generation system, in accordance with one embodiment.

FIG. 2E illustrates a block diagram of a video generation system 255, in accordance with one embodiment. The video generation system 255 includes the RNN 212 and the generator neural network 220. During training, the video generation system 255 also includes the samplers 205 and 215, image discriminator 225, and video discriminator 230.

Dynamics in videos are often categorical (e.g., discrete action categories: walking, running, jumping, etc.). Examples of an action categories are facial expressions or motion directions. In one embodiment, the input to the RNN 210 is augmented with a categorical random variable, $z_A$. In one embodiment, $z_A$ is a one-hot vector. For example, when six different facial expressions are available the one-hot vector for the facial expression category comprises 6 bits, one bit for each label. In one embodiment, $z_A$ is fixed since the action category in a short video remains the constant. The input to the RNN 210 is then given by $$\left[\begin{bmatrix} z_A \\ \epsilon^{(1)} \end{bmatrix}, \cdots, \begin{bmatrix} z_A \\ \epsilon^{(K)} \end{bmatrix}\right]. \quad (7)$$

To relate $z_A$ to the true action category, the objective function in equation (6) may be augmented to $\mathcal{F}_V(D_I, D_V, G_I, R_M) + \lambda L_I(G_I, Q)$ where $L_I$ is a lower bound of the mutual information between the generated video clip and $z_A$, $\lambda$ is a hyperparameter, and the auxiliary distribution Q (which approximates the distribution of the action category variable conditioning on the video clip) is implemented by adding a softmax layer to the last feature layer of the video discriminator 230. In one embodiment, $\lambda=1$. Note that when the labeled training data are available, Q can be trained to output the category label for a real input video clip to further improve the performance.

In one embodiment, the generator neural network 220 in the video generation system 200 is replaced with an encoder-decoder architecture, where the encoder produces the content code $Z_C$ and the initial motion code $z_m^{(0)}$. Subsequent motion codes are produced by the RNN 210 and concatenated with the content code to generate each frame. In other words, the input is an image and the output is a video clip.

Given sufficient video training data, the video generation system 200 automatically learns to disentangle motion from content in an unsupervised manner. For instance, given videos of people performing different facial expressions, the video generation system 200 learns to separate a person's identity from their expression, thus allowing synthesis of a new video clip of a person performing different expressions, or fixing the expression and generating various identities. The video clip generation is enabled by a generative adversarial network, which generates a video clip by sequentially generating video frames. Each video frame is generated from a random vector, which consists of two parts, one signifying content and one signifying motion. The content subspace is modeled with a Gaussian distribution, whereas the motion subspace is modeled with the RNN 210. The content subspace and motion subspace are sampled in order to synthesize each video frame.

Parallel Processing Architecture

Figure 3:
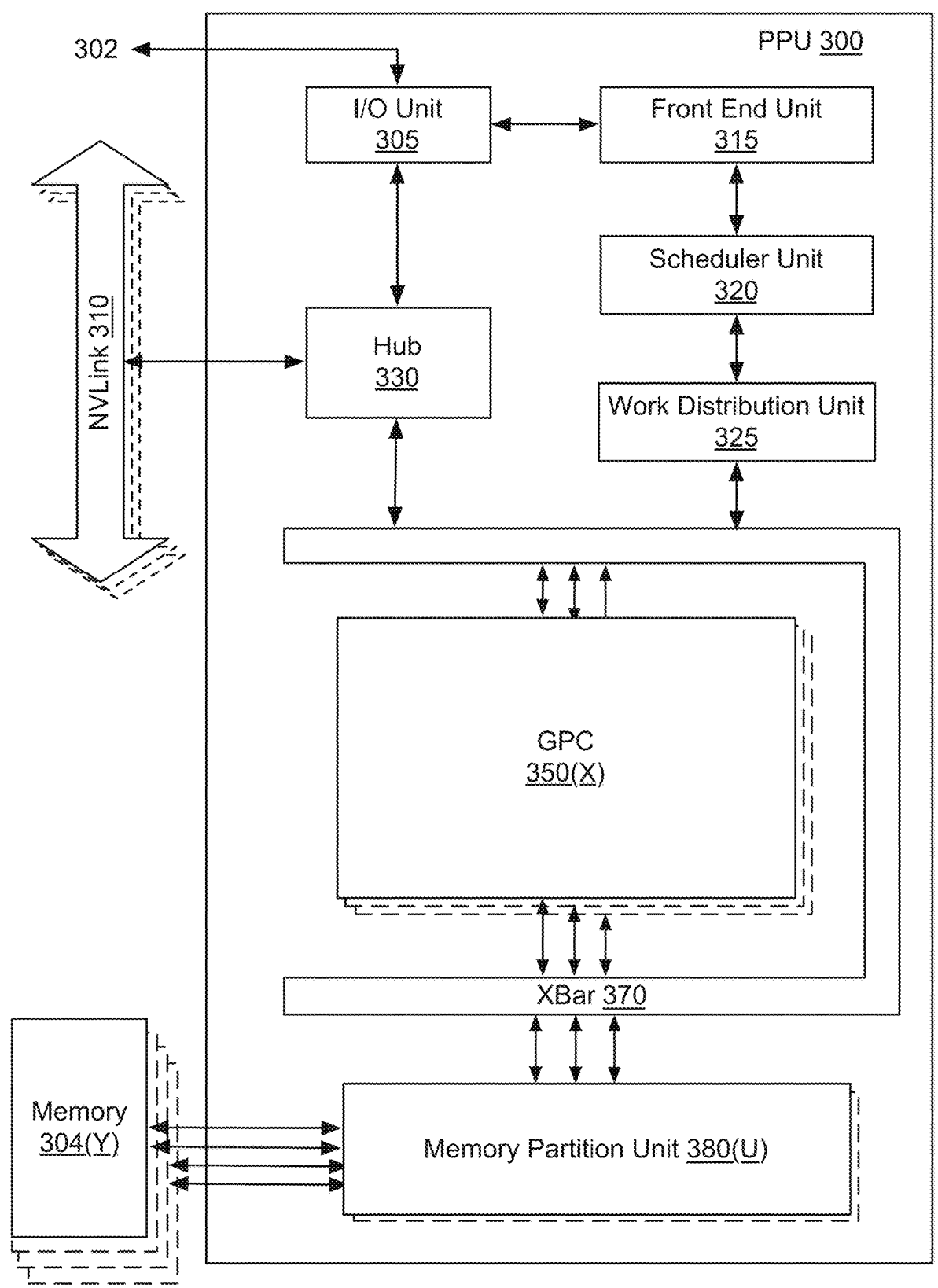
FIG. 3 illustrates a parallel processing unit, in accordance with one embodiment.

FIG. 3 illustrates a parallel processing unit (PPU) 300, in accordance with one embodiment. In one embodiment, the PPU 300 is a multi-threaded processor that is implemented on one or more integrated circuit devices. The PPU 300 is a latency hiding architecture designed to process many threads in parallel. A thread (i.e., a thread of execution) is an instantiation of a set of instructions configured to be executed by the PPU 300. In one embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In one embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5A.

The I/O unit 305 is configured to transmit and receive communications (i.e., commands, data, etc.) from a host processor (not shown) over the interconnect 302. The I/O unit 305 may communicate with the host processor directly via the interconnect 302 or through one or more intermediate devices such as a memory bridge. In one embodiment, the I/O unit 305 may communicate with one or more other processors, such as one or more the PPUs 300 via the interconnect 302. In one embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In one embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In one embodiment, a program executed by the host processor encodes a command stream in a buffer that provides workloads to the PPU 300 for processing. A workload may comprise several instructions and data to be processed by those instructions. The buffer is a region in a memory that is accessible (i.e., read/write) by both the host processor and the PPU 300. For example, the host interface unit 310 may be configured to access the buffer in a system memory connected to the interconnect 302 via memory requests transmitted over the interconnect 302 by the I/O unit 305. In one embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In one embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 304 or CPU via the NVLink 310. In one embodiment, the PPU 300 includes a number U of partition units 380 that is equal to the number of separate and distinct memory devices 304 coupled to the PPU 300. A partition unit 380 will be described in more detail below in conjunction with FIG. 4B.

In one embodiment, a host processor executes a driver kernel that implements an application programming interface (API) that enables one or more applications executing on the host processor to schedule operations for execution on the PPU 300. In one embodiment, multiple compute applications are simultaneously executed by the PPU 300 and the PPU 300 provides isolation, quality of service (QoS), and independent address spaces for the multiple compute applications. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In one embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
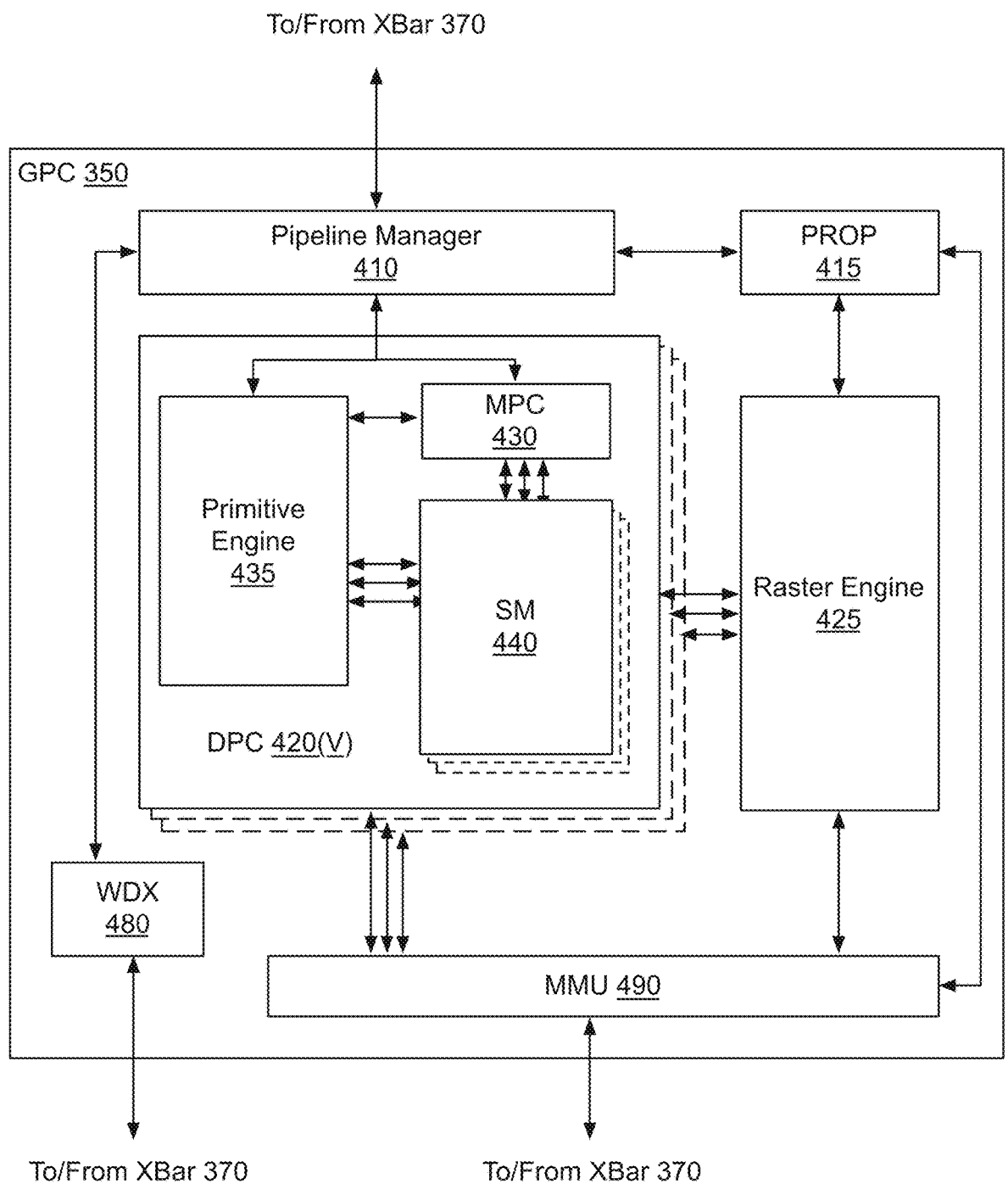
FIG. 4A illustrates a general processing cluster within the parallel processing unit of FIG. 3, in accordance with one embodiment.

FIG. 4A illustrates a GPC 350 of the PPU 300 of FIG. 3, in accordance with one embodiment. As shown in FIG. 4A, each GPC 350 includes a number of hardware units for processing tasks. In one embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In one embodiment, the operation of the GPC 350 is controlled by the pipeline manager 410. The pipeline manager 410 manages the configuration of the one or more DPCs 420 for processing tasks allocated to the GPC 350. In one embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In one embodiment, the pipeline manager 410 may configure at least one of the one or more DPCs 420 to implement a neural network model and/or a computing pipeline.

Figure 4B:
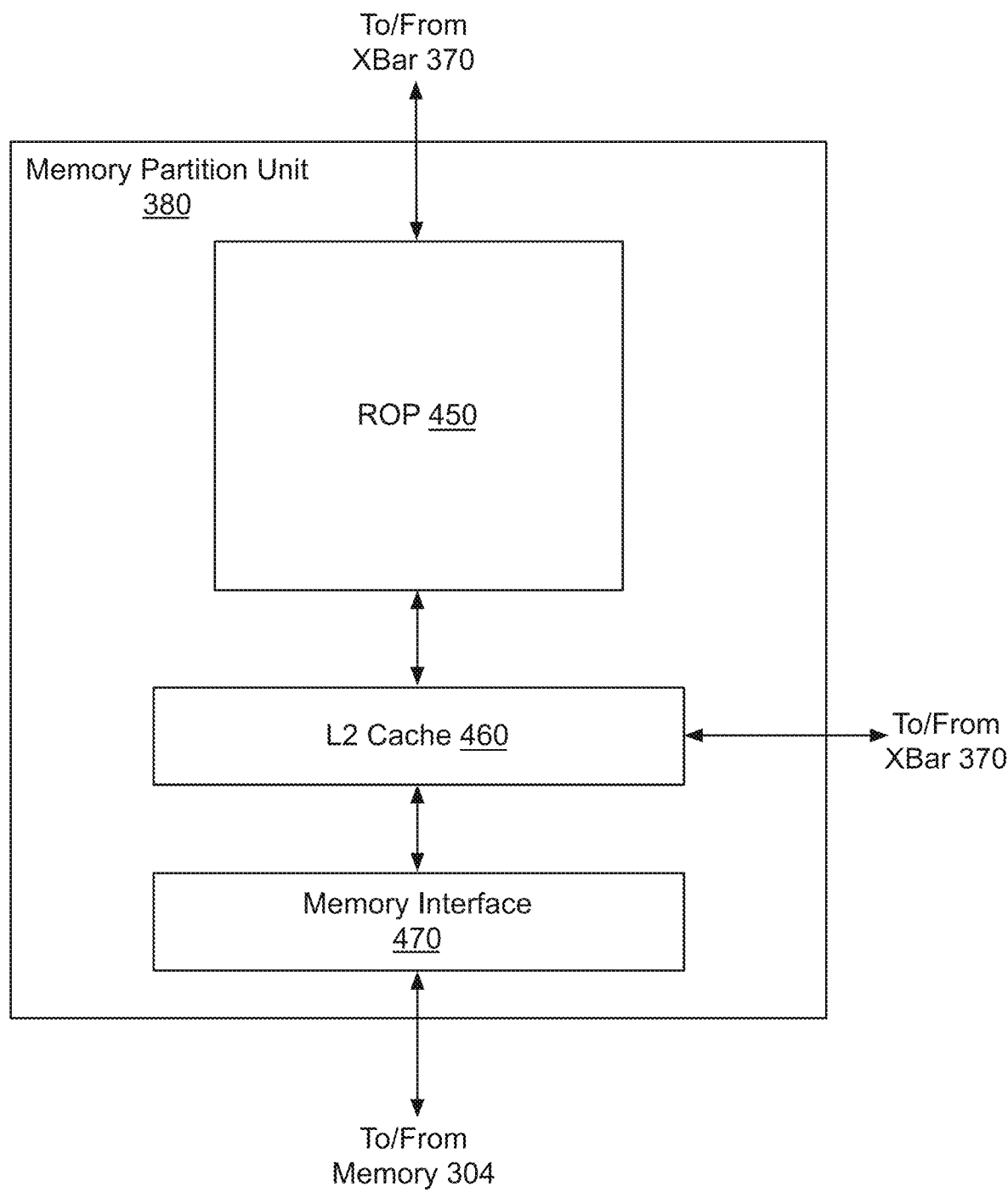
FIG. 4B illustrates a memory partition unit of the parallel processing unit of FIG. 3, in accordance with one embodiment.

The PROP unit 415 is configured to route data generated by the raster engine 425 and the DPCs 420 to a Raster Operations (ROP) unit in the partition unit 380, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In one embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In one embodiment, the SM 440 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In one embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the partition unit 380. The MMU 490 may provide translation of virtual addresses into physical addresses, memory protection, and arbitration of memory requests. In one embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with one embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In one embodiment, the PPU 300 incorporates U memory interfaces 470, one memory interface 470 per pair of partition units 380, where each pair of partition units 380 is connected to a corresponding memory device 304. For example, PPU 300 may be connected to up to Y memory devices 304, such as high bandwidth memory stacks or graphics double-data-rate, version 5, synchronous dynamic random access memory (GDDR5 SDRAM).

In one embodiment, the memory interface 470 implements an HBM2 memory interface and Y equals half U. In one embodiment, the HBM2 memory stacks are located on the same physical package as the PPU 300, providing substantial power and area savings compared with conventional GDDR5 SDRAM systems. In one embodiment, each HBM2 stack includes four memory dies and Y equals 4, with HBM2 stack including two 128-bit channels per die for a total of 8 channels and a data bus width of 1024 bits.

In one embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In one embodiment, the PPU 300 implements a multi-level memory hierarchy. In one embodiment, the memory partition unit 380 supports a unified memory to provide a single unified virtual address space for CPU and PPU 300 memory, enabling data sharing between virtual memory systems. In one embodiment the frequency of accesses by a PPU 300 to memory located on other processors is traced to ensure that memory pages are moved to the physical memory of the PPU 300 that is accessing the pages more frequently. In one embodiment, the NVLink 310 supports address translation services allowing the PPU 300 to directly access a CPU's page tables and providing full access to CPU memory by the PPU 300.

In one embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370.

Figure 5A:
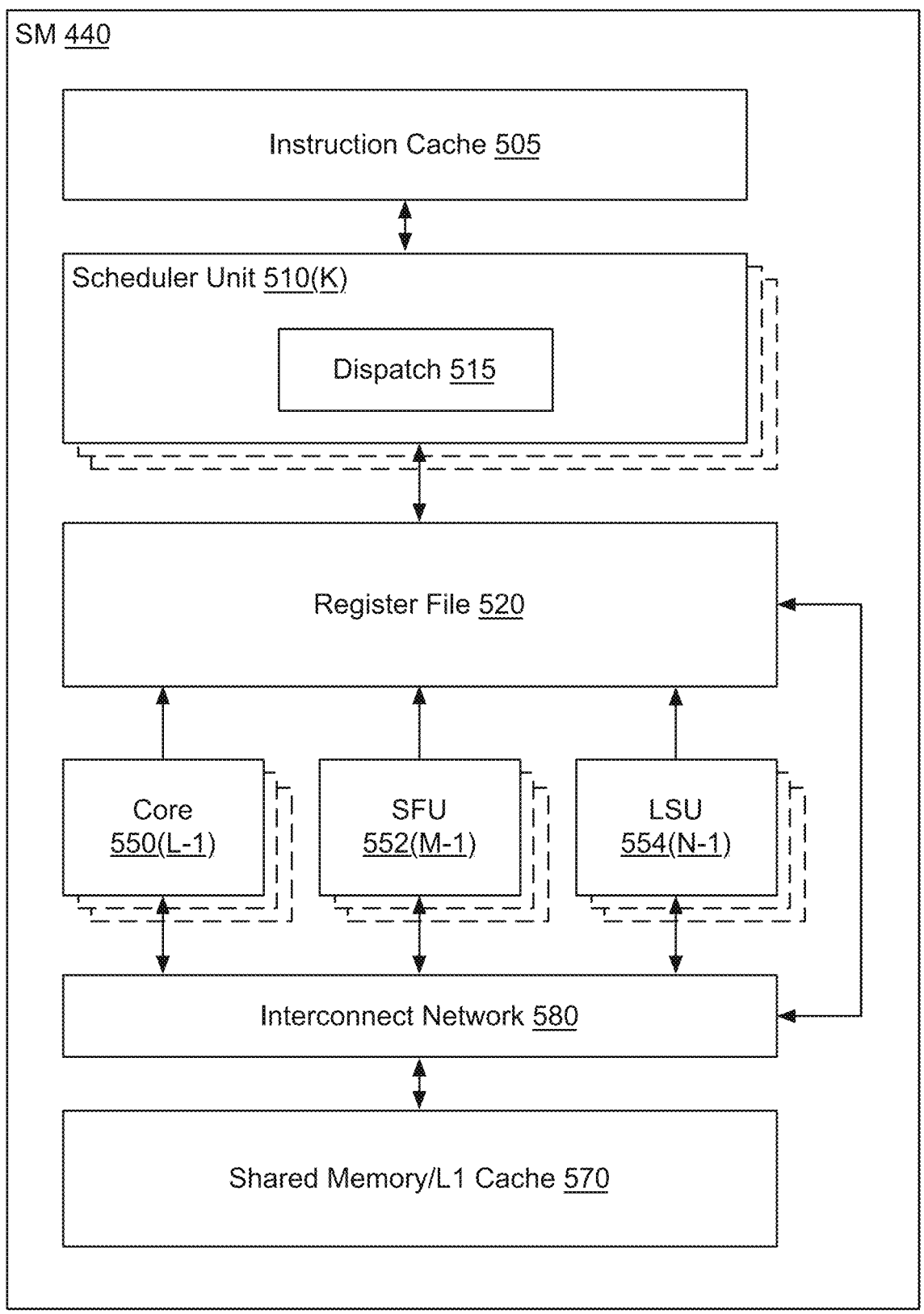
FIG. 5A illustrates the streaming multi-processor of FIG. 4A, in accordance with one embodiment.

FIG. 5A illustrates the streaming multi-processor 440 of FIG. 4A, in accordance with one embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In one embodiment, each warp executes 32 threads. The scheduler unit 510 may manage a plurality of different thread blocks, allocating the warps to the different thread blocks and then dispatching instructions from the plurality of different cooperative groups to the various functional units (i.e., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In one embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In one embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In one embodiment, the floating point arithmetic logic units implement the IEEE 754-2008 standard for floating point arithmetic. In one embodiment, the cores 550 include 64 single-precision (32-bit) floating point cores, 64 integer cores, 32 double-precision (64-bit) floating point cores, and 8 tensor cores.

Tensor cores configured to perform matrix operations, and, in one embodiment, one or more tensor cores are included in the cores 550. In particular, the tensor cores are configured to perform deep learning matrix arithmetic, such as convolution operations for neural network training and inferencing. In one embodiment, each tensor core operates on a 4×4 matrix and performs a matrix multiply and accumulate operation D=A×B+C, where A, B, C, and D are 4×4 matrices.

In one embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In one embodiment, the SFUs 552 may include a tree traversal unit configured to traverse a hierarchical tree data structure. In one embodiment, the SFUs 552 may include texture unit configured to perform texture map filtering operations. In one embodiment, the texture units are configured to load texture maps (e.g., a 2D array of texels) from the memory 304 and sample the texture maps to produce sampled texture values for use in shader programs executed by the SM 440. In one embodiment, the texture maps are stored in the shared memory/L1 cache 470. The texture units implement texture operations such as filtering operations using mip-maps (i.e., texture maps of varying levels of detail). In one embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In one embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In one embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In one embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In one embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. The PPU 300 may be configured to implement the video generation system 200 during training and for deployment. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

Exemplary Computing System

Figure 5B:
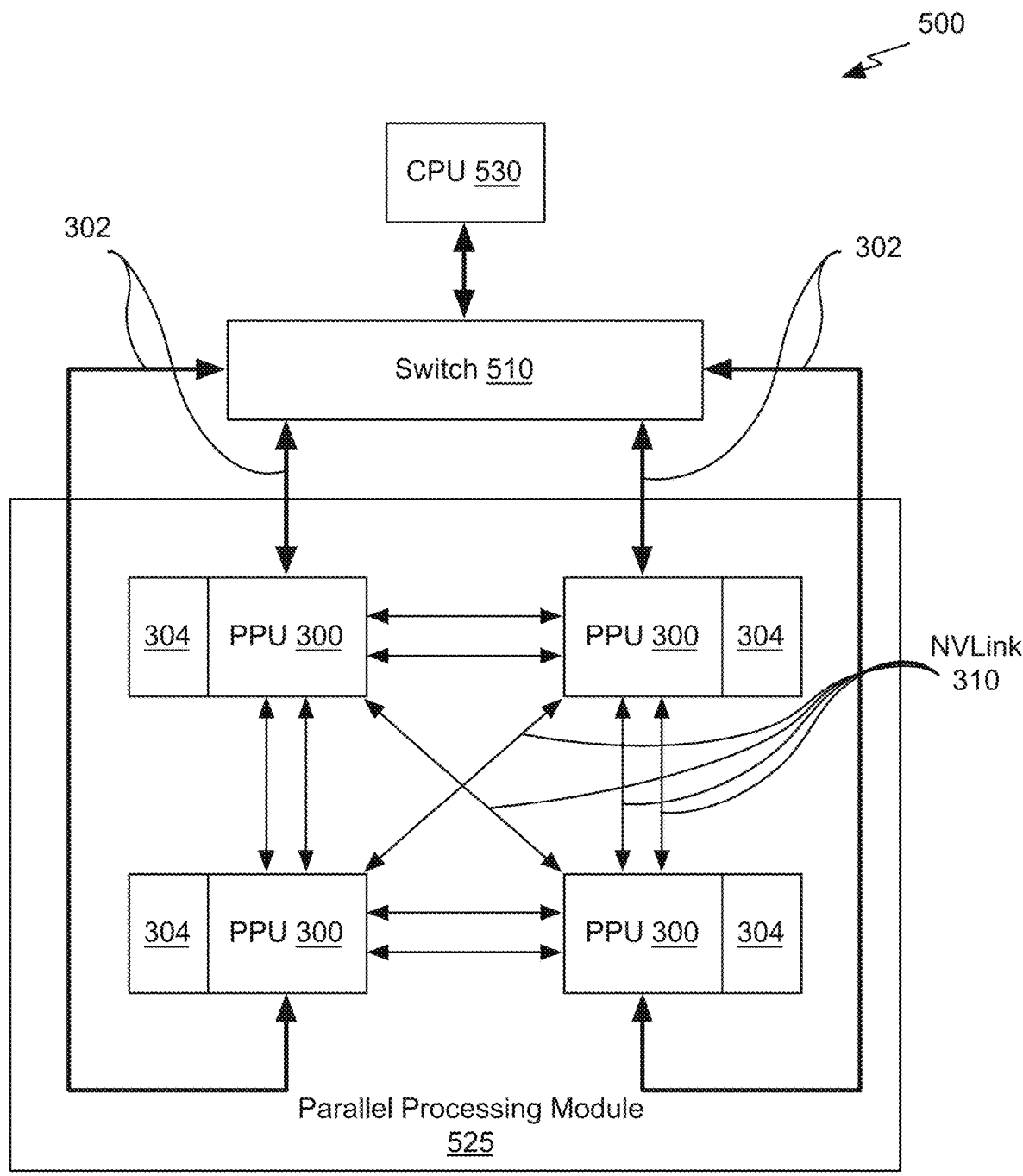
FIG. 5B is a conceptual diagram of a processing system implemented using the PPU of FIG. 3, in accordance with one embodiment.

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased FIG. 5B is a conceptual diagram of a processing system 500 implemented using the PPU 300 of FIG. 3, in accordance with one embodiment. The exemplary system 565 may be configured to implement the methods or system shown in FIGS. 1F, 2B, 2C, and 2D. The processing system 500 includes a CPU 530, switch 510, and multiple PPUs 300 each and respective memories 304. The NVLink 310 provides a high-speed communication links between each of the PPUs 300. The switch 510 interfaces between the interconnect 302 and the CPU 530. The PPUs 300, memories 304, and NVLinks 310 may be situated on a single semiconductor platform to form a parallel processing module 525.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In one embodiment, the CPU 530, switch 510, and the parallel processing module 525 are situated on a single semiconductor platform.

In one embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In one embodiment, the NVLink 310 allows direct load/store/atomic access from the CPU 530 to each PPU's 300 memory 304. In one embodiment, the NVLink 310 supports coherency operations, allowing data read from the memories 304 to be stored in the cache hierarchy of the CPU 530, reducing cache access latency for the CPU 530. In one embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
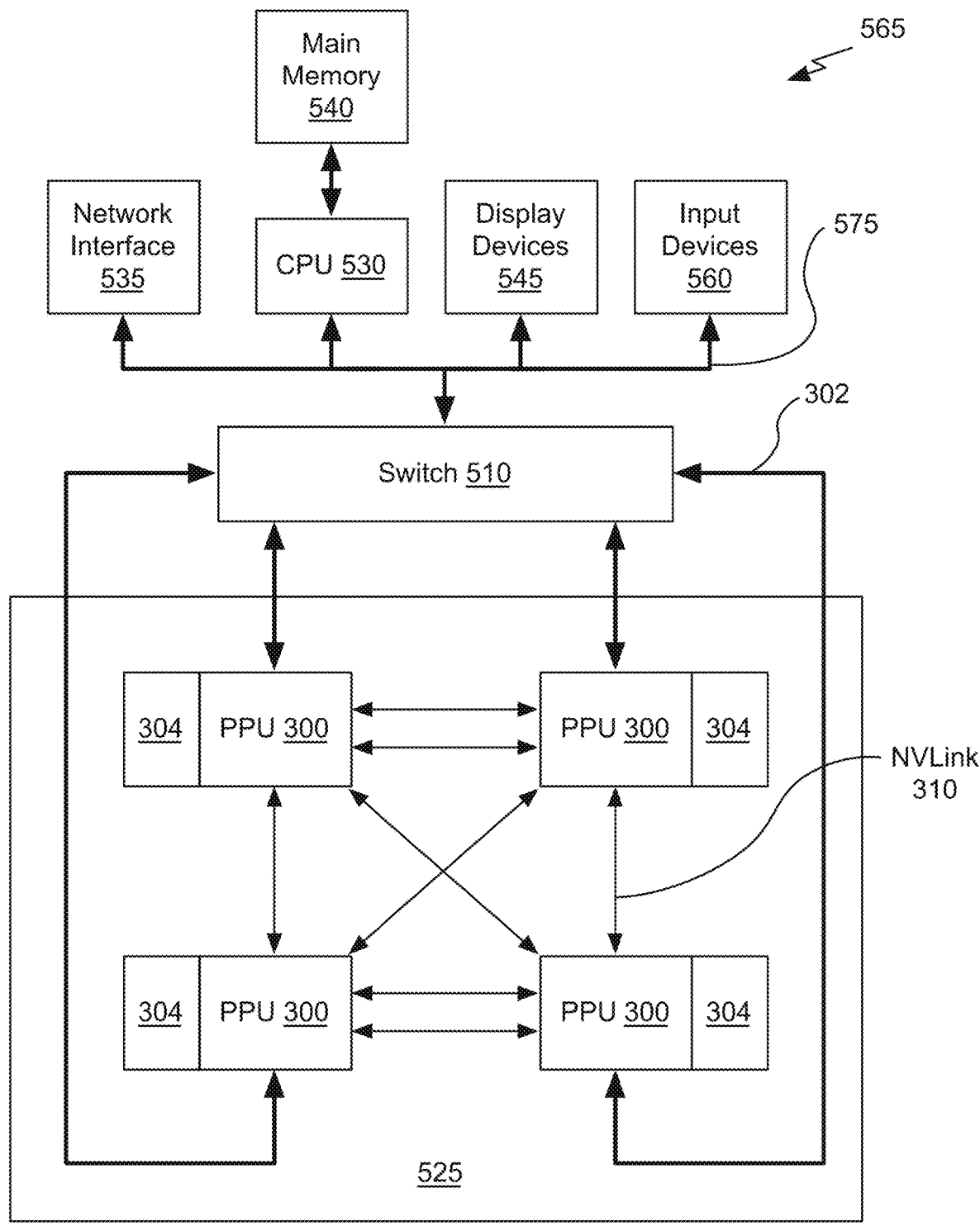
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the methods or system shown in FIGS. 1F, 2A, 2B, 2C, and 2D.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, i.e. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
generating, by a recurrent neural network, a sequence of motion vectors from a first set of random variables;
receiving, by a generator neural network, the sequence of motion vectors and a content vector sample; and
processing the sequence of motion vectors and the content vector sample by the generator neural network to produce a video clip.

2. The computer-implemented method of claim 1, further comprising:

generating, by the recurrent neural network, an additional sequence of motion vectors from a second set of random variables; and processing the additional sequence of motion vectors and the content vector sample by the generator neural network to produce an additional video clip.

3. The computer-implemented method of claim 2, wherein a number of frames in the video clip differs from a number of frames in the additional video clip.

4. The computer-implemented method of claim 1, further comprising:

receiving, by the generator neural network, an additional content vector sample; and processing the first sequence of motion vectors and the additional content vector sample by the generator neural network to produce an additional video clip.

5. The computer-implemented method of claim 1, further comprising generating, by an encoder, the content vector sample based on identified content.

6. The computer-implemented method of claim 1, further comprising sampling a Gaussian distribution of content to produce the content vector sample.

7. The computer-implemented method of claim 1, further comprising:

sampling the video clip to produce image frames; and processing the image frames by a discriminative neural network configured to distinguish real images from generated images to generate updated parameters for the generator neural network.

8. The computer-implemented method of claim 1, further comprising:

sampling the video clip to produce sets of sequential frames; and processing the sets of sequential frames by a discriminative neural network configured to distinguish real video clips from generated video clips to generate updated parameters for the generator neural network and the recurrent neural network.

9. The computer-implemented method of claim 1, further comprising, prior to generating the sequence of motion vectors, combining an action label associated with an action category with the first set of random variables.

10. The computer-implemented method of claim 9, wherein the action category represents facial expression.

11. The computer-implemented method of claim 9, wherein the action category represents motion directions.

12. A system, comprising:

a parallel processing unit configured to implement a recurrent neural network and a generator network, wherein the recurrent neural network is configured to generate a sequence of motion vectors from a first set of random variables, the generator neural network receives the sequence of motion vectors and a content vector sample, and the generator neural network processes the sequence of motion vectors and the content vector sample to produce a video clip.

13. The system of claim 12, wherein the recurrent neural network is further configured to generate an additional sequence of motion vectors from a second set of random variables; and the generator neural network is further configured to process the additional sequence of motion vectors and the content vector sample by to produce an additional video clip.

14. The system of claim 13, wherein a number of frames in the video clip differs from a number of frames in the additional video clip.

15. The system of claim 12, wherein the generator neural network is further configured to receive an additional content vector sample; and the generator neural network is further configured to process the first sequence of motion vectors and the additional content vector sample to produce an additional video clip.

16. The system of 12, further comprising an encode configured to generate the content vector sample based on identified content.

17. The system of claim 12, further comprising sampling a Gaussian distribution of content to produce the content vector sample.

18. The system of claim 12, further comprising:

an image sampler configured to sample the video clip to produce image frames; and a discriminative neural network configured to:

process the image frames, distinguishing real images from the image frames; and generate updated parameters for the generator neural network.

19. The system of claim 12, further comprising:

a video sampler configured to sample the video clip to produce sets of sequential frames; and a discriminative neural network configured to:

process the sets of sequential frames, distinguishing real video clips from the sets of sequential frames; and generate updated parameters for the generator neural network and the recurrent neural network.

20. A non-transitory computer-readable media storing computer instructions for translating images that, when executed by a processor, cause the processor to perform the steps of:

generating, by a recurrent neural network, a sequence of motion vectors from a first set of random variables; and receiving, by a generator neural network, the sequence of motion vectors and a content vector sample; and processing the sequence of motion vectors and the content vector sample by the generator neural network to produce a video clip.

* * * * *